United States Patent [19]

Comer, Jr. et al.

[11] 4,301,834
[45] Nov. 24, 1981

[54] ADJUSTMENT METHOD PIPELAYER CONTROL SYSTEM

[76] Inventors: Glen S. Comer, Jr., Dunlap; Henry Ejchler, East Peoria, both of Ill.

[21] Appl. No.: 73,409

[22] Filed: Feb. 2, 1979

[51] Int. Cl.³ .................. F16K 11/18; F16K 35/02; F16K 37/00; G05G 9/02
[52] U.S. Cl. ................... 137/556; 137/636.2; 251/114; 251/294; 74/471 XY; 116/277
[58] Field of Search ............. 74/471 XY; 251/294, 251/114; 137/556, 553, 559, 636, 636.2; 403/343, 320; 116/277, 282, 283

[56] References Cited

U.S. PATENT DOCUMENTS

| | | | |
|---|---|---|---|
| 828,832 | 8/1906 | Warren | 137/553 |
| 1,105,090 | 7/1914 | Metzger | 251/294 |
| 1,903,695 | 4/1933 | Chobert | 403/343 |
| 2,302,158 | 11/1942 | Von Vulpen | 137/553 |
| 3,393,579 | 7/1968 | Wolf | 74/501 |
| 3,633,436 | 1/1972 | Freiburger | 74/471 XY |
| 3,757,612 | 9/1973 | Schaefer | 74/501 R |
| 4,023,636 | 5/1977 | Levin | 74/471 XY |
| 4,235,415 | 11/1980 | Heckenkamp | 251/294 |

Primary Examiner—A. Michael Chambers

[57] ABSTRACT

An adjusting mechanism (92) is provided between a valve spool (62) and a valve actuating lever (26) whereby with the lever (26) locked in a selected position, the mechanism (92) is manipulated to move an element (99) carried by the valve spool (62) into alignment with an indicator (110) that has been predetermined to be the selected setting of the valve. With the element (99) aligned with the indicator (110), the mechanism (92) is locked so that the valve spool (62) is in the selected setting when the lever (26) is in the selected position. A lockdown apparatus (70) is provided for use in locking the lever (26) in the selected position while the adjusting mechanism (92) is being manipulated. An overtravel prevention apparatus is also provided whereby as a member (22) approaches its predetermined limit of movement, a linkage system (128,132,136,144,146) is actuated which engages with parts (103) on the cable (58) from the actuating lever (26) to the valve spool (62) which overrides the actuating lever (26) and moves the actuating lever (26) and the valve spool (62) to a neutral position, preventing the member (22) from moving beyond its predetermined limit.

9 Claims, 8 Drawing Figures

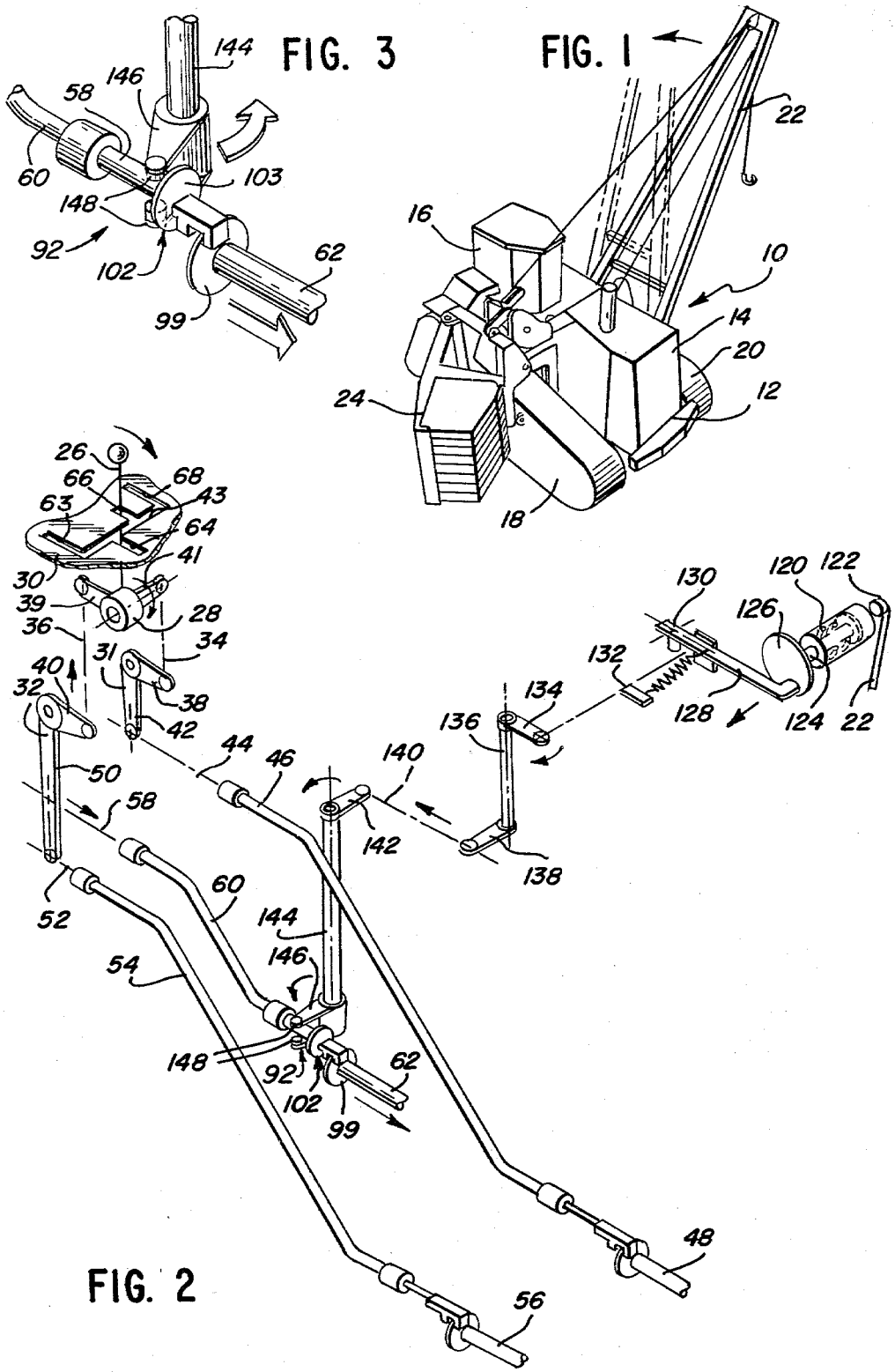

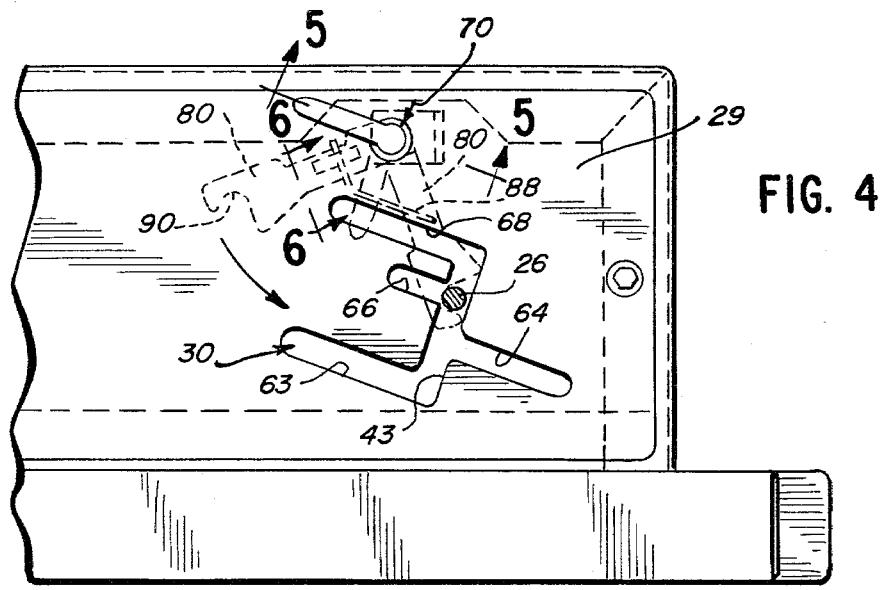
FIG. 4
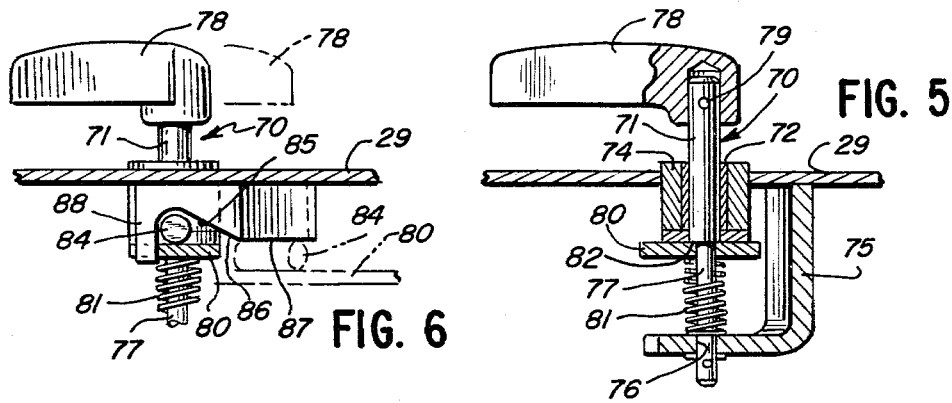
FIG. 5
FIG. 6
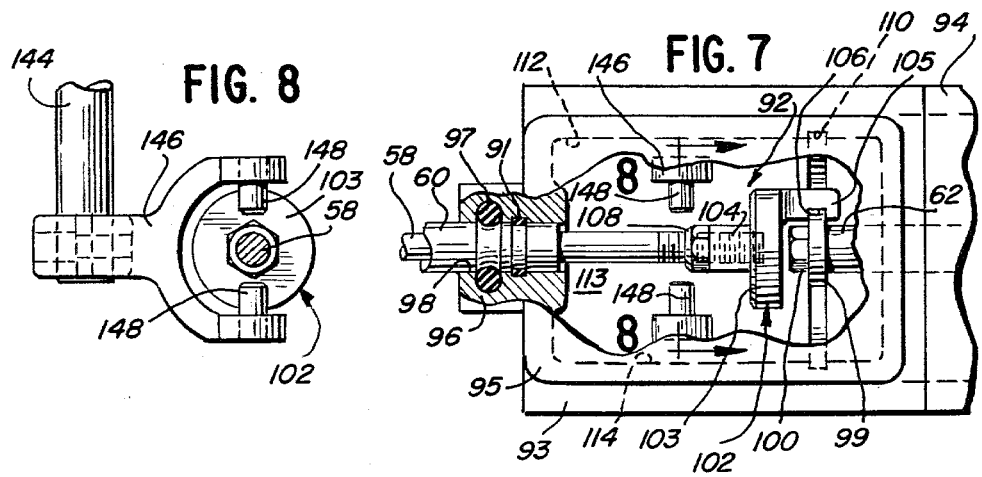
FIG. 8
FIG. 7

ADJUSTMENT METHOD PIPELAYER CONTROL SYSTEM

DESCRIPTION

1. Technical Field

This invention relates to hydraulic actuators and, more particularly, to a mechanism for adjusting a selected position of a valve spool with respect to a corresponding selected position of an actuating lever and also for preventing overtravel of a work member.

2. Background Art

In the use of hydraulic actuators for controlling the operation of a device, such as the controls for raising and lowering the hook of a pipelayer or for adjusting the speed for raising and lowering the hook of a pipelayer, and the like, it is quite important that the neutral position of the control lever corresponds exactly with the neutral position of the valve so that the operating element will not operate when the control lever is in the neutral position. Currently, different types of variable connectors are provided between the control cable extending from the control actuator lever to the valve spool, which variable connectors are adjusted in a trial and error method until the neutral position of the actuator corresponds with the neutral position of the valve.

In addition, in certain hydraulically-driven apparatus, the actuated member must not travel beyond a certain point, otherwise damage to the member or to the operating equipment is highly likely. Limit controls have been provided whereby contact by the member will release a clutch in the drive mechanism so as to disconnect the drive from the member. This requires considerable linkage to extend from the wench to the kickout actuator.

DISCLOSURE OF INVENTION

The present invention is directed to overcoming one or more of the problems as set forth above.

An adjusting mechanism is provided for setting a valve spool and an actuating lever in a common position. The valve spool extends axially outward from the valve body and has a part on the extending end thereof exterior of said valve body. An indicator is located exterior of the valve body along the path of movement of the valve spool to indicate a selected position of the valve spool when said part on the valve spool aligns with the indicator. A cable connects the actuating lever with the valve spool and has a connector in connecting relationship with said part on the valve spool. A lock down knob is provided for locking the actuating lever in a selected position, which position coincides with the selected position indicated by the indicator. The part on the valve spool and said connector on the cable are adjustable relative to each other to set the part on the valve spool in alignment with the indicator whereby the lever and valve spool are set in a common position.

A limit control is provided for preventing an operating member from moving beyond a predetermined limit. The control has a bumper which engages a plunger to move a linkage system that actuates a probe that, in turn, moves the valve spool and actuating lever to a neutral position to discontinue movement of the operating member.

BRIEF DESCRIPTION OF DRAWINGS

FIG. 1 is a perspective view of a crawler-type vehicle incorporating the invention therein;

FIG. 2 is a somewhat schematic view showing a valve-adjusting mechanism and a kickout mechanism;

FIG. 3 is a somewhat enlarged schematic view of the valve-adjusting mechanism and the connection of the kickout mechanism;

FIG. 4 is a plan view of the actuator lever, slotted plate and lock down handle;

FIG. 5 is a cross-sectional view taken along the lines 5—5 of FIG. 4 in slightly enlarged form;

FIG. 6 is a cross-sectional view taken along the lines 6—6 of FIG. 4 in slightly enlarged form;

FIG. 7 is a broken away view of the adjusting mechanism and the interconnection between the kickout mechanism and the valve stem; and FIG. 8 is a cross-sectional view taken along the lines 8—8 of FIG. 7.

BEST MODE FOR CARRYING OUT THE INVENTION

Referring to FIG. 1, a crawler-type vehicle used as a pipelayer 10 is illustrated and includes a frame member 12 upon which is supported an engine encasing housing 14 and a cab 16. A pair of track assemblies 18 and 20 are disposed on opposite sides of the main frame 12. A boom 22 is operatively attached to one side of the vehicle 10 and a counterweight 24 is attached to the opposite side thereof. Although this invention is described specifically with respect to the pipelayer illustrated in FIG. 1, it is to be understood that it can be used with any hydraulic control wherever it is desirable or necessary to set a selected position, such as a neutral position, on a control lever and a valve, and on any equipment where a member, such as the boom of a pipelayer, and the like, should not move beyond a predetermined point.

Referring to FIG. 2, there is schematically illustrated, a hydraulic actuating system which includes an actuator lever 26 pivotally and rotatably mounted about a universal mount 28 carried by the frame 12 of the vehicle 10. The actuator lever 26 projects up through a slotted plate 29 having a grid 30 attached to the control surface of the console of the cab 16 and which plate 29 is appropriately marked for indicating the position of the lever 26 in the grid 30 for raising or lowering the boom, for increasing or decreasing the speed, for setting the brake and for the neutral position of the associated valves. As illustrated, a pair of bellcranks 31 and 32 are pivotally mounted on the frame 12 of the tractor with links 34,36, illustrated only by dashed lines, interconnecting the arms 39,41 of the universal mount 28 with the legs 38,40 of the respective bellcranks 31 and 32. Link 34 is connected to an axially extending arm 41 carried by the mount 28 such that the link 34 is moved along its axis when the lever 26 is moved from side to side along the main track 43 of the grid 30. Bellcrank 31 has a second leg 42 which is connected to a control cable 44 extending through a cable sheath 46 for actuating a valve spool 48 of a hydraulic valve.

The second bellcrank 32 has an elongate leg 50 extending at an angle to leg 40 with the lower extremity of the leg 50 being connected to a control cable 52 which extends through a cable sheath 54 for connection to a valve spool 56 of a second hydraulic valve. Connected to an intermediate portion of the elongate leg 50 of the bellcrank 32 is a control cable 58 which extends through a cable sheath 60 for connection to a valve spool 62 of still a third hydraulic valve. It is recognized as conventional to move the actuating lever 26 laterally or transversely as allowed by the grid 30 of the plate 29 which will either pivot or rotate the universal mount 28 to actuate one or the other bellcrank 31,32, cables 44,52,58 and the valves connected thereto. As an example, if the lever 26 is moved to the left, it will pivot the universal mount 28 and thereby cause the link 34 to pivot the bellcrank 31 and move the cable 44 to actuate the valve connected to the valve spool 48. Since the arm 39 of the universal mount 28 is not raised or lowered when the lever 26 is moved left or right, the link 36 and the bellcrank 32 will remain in a neutral position. However, as shown in FIGS. 2 and 4, pivoting the lever 26 into any of the branches 63,64,66,68 in the grid 30, which branches extend transverse to the main track 43, will pivot the bellcrank 32 which, in turn, will actuate the cables 52 and 58 to operate the valve spools 56,62. It is important that the position of the lever 26 corresponds exactly with the position of the spool in the valve so that the valve will function to properly raise or lower an apparatus, to speed up or slow down movement of the apparatus, or to apply a brake with various degrees of force, or the like.

Referring to FIGS. 4, 5 and 6, as well as to FIG. 2, the grid 30 on the plate 29 on the console has a neutral position which is shown in FIG. 4 in alignment with the branch 66 and lying in the track 43. A lock-down apparatus 70 is provided for locking the actuating lever 26 in the neutral position. The lock-down apparatus 70 has a shaft 71 extending through a bearing sleeve 72 in a collar 74 fixed in the plate 29. A bracket 75 is secured on the undersurface of the plate 29 and has an opening 76 for receiving a reduced diameter portion 77 of the shaft 71 so as to support the shaft 71 vertically. On the exposed end of the shaft 71 is affixed a knob 78 which is keyed at 79 to the shaft 71 so that turning the knob 78 in a plain parallel to the plate 29 will rotate the shaft 71 about a vertical axis. An elongate planar latch plate 80 is pivotally mounted on the reduced diameter portion 77 of the shaft 71 and is spring-urged by a coil spring 81 extending between the bracket 75 and the plate 80 for holding the plate 80 resiliently against the shoulder 82 on the shaft 71 and against the mounting collar 74 carried by the plate 29. A pin 84 is affixed to the top surface of the plate 80 with the longitudinal axis of the pin 84 substantially parallel to the longitudinal axis of the latch plate 80. A cam-shaped guide 85 is secured to the undersurface of the plate 29 and has an angular ramp 86 formed in the edge 87, with said ramp 86 terminating in a stop 88. The ramp 86 and stop 88 form a rest socket into which the pin 84 can nest as shown in FIG. 6. Turning the knob 78 in a counterclockwise direction will turn the shaft 71 and the plate 80 whereupon the pin 84 on the plate 80 will travel down the ramp 86 thereby depressing the spring 81 and moving the plate 80 both axially and radially with respect to the shaft. As shown in dotted lines in FIG. 4, the plate 80 has a hook-shaped cutout 90 at the outer end thereof, which cutout 90 is located in such a way that pivoting the knob 78 will pivot the latch plate 80 into position with respect to the actuating lever 26 so as to nest the actuating lever 26 in the hook of the hook-shaped cutout 90 when the actuating lever 26 is in the neutral position. Lock down 70 also acts as a safety device to prevent inadvertently bumping the lever 26 into an actuating position.

Referring to FIGS. 2, 3 and 7, and assuming that the lock-down apparatus 70 has the actuating lever 26 locked in the neutral position, a mechanism 92 is provided for adjusting the position of the spool 62 of a valve in the neutral position so that the neutral positions of the actuating lever 26 and the valve spool 62 coincide exactly. In FIG. 7, a housing 93 is shown attached to a valve body 94, which housing 93 has a cover plate 95 which can be removed to gain access to the inside of the housing. The cable 58, travelling through the sheath 60, moves axially with respect to the sheath and into the housing of FIG. 7. Sheath 60 is retained by a retainer 91 in a boss 96 on the housing 93 and is sealed against leakage by the ring 97 (FIG. 7) extending between the sheath 60 and the inside of the opening 98 in the boss 96. The valve spool 62 has a washer or collar 99 seated against the end of the spool 62 by a bolt 100 threaded into a threaded opening in the end of the spool. A connector 102 has a disc-shaped body portion 103 with an internally threaded boss 104 extending axially from one side thereof and with an axially projecting, radially disposed key 105 extending from the other side thereof. The key 105 has a slot 106 facing radially toward the axis of the connector 102. The connector 102 can be moved axially with respect to the end of the cable 58 by rotating the connector 102 relative to the cable 58 whereby the threaded boss 104 will advance or retract the connector 102 relative to the cable 58. The washer 99 nests in the slot 106 in the key 105 on the connector 102 so that the washer 99 and spool 62 are moved axially as the connector 102 is rotated relative to the cable 58. The lead of the mating threads on the cable 58 and in the threaded boss 104 on the connector 102 will determine the rate of axial relative movement between connector 102 and the cable 58. The connector 102 can be locked relative to the end of the cable 58 by threading the lock nut 108 against the end of the boss 104.

The inside of the housing 93 has a groove 110 formed in the walls 112,113,114 thereof. The groove 110 is formed in alignment with the washer 99 on the end of the spool 62 when the spool 62 is in the neutral position in the valve in the valve body 94. The groove 110 formed in the housing 93 can be any form of visual indication or indicator which can be affixed or attached to the inside wall or walls 112, 113,114 of the housing 93 and is located at the precise point where the washer 99 aligns therewith when the valve is in the neutral position.

In practice, with the actuator lever 26 locked down in the neutral position by the lockdown apparatus 70, the nut 108 on the end portion of the cable 58 is loosened. The connector 102 is rotated relative to the cable 58 to move the key 105 and washer 99 axially of the cable 58 until the washer 99 on the spool 62 is in exact alignment with the groove 110 on the wall of the housing 93. At that point, the nut 108 is drawn up tight against the connector 102 to lock the connector 102 in position whereby the neutral position of the actuator lever 26 corresponds exactly with the neutral setting of the spool 62 of the valve.

Using the improved mechanism 92 makes it possible to accurately and positively set the neutral position of the lever 26 and valve spool 62 without the trial and error method used heretofore.

In addition, many vehicles have operating members that must be limited in their movement so as to prevent damage to or tipping of the vehicle. One such vehicle is a crawler-type pipelayer, such as illustrated in FIG. 1, wherein the operating member is the boom 22 which, in operation, should not be moved to the vertical or over-vertical position, otherwise the boom will bend in the middle. An actuator, such as a spring can 120, see FIG. 2, is provided in alignment with one of the parts of the boom 22 so that when the boom reaches approximately 88° with respect to the horizontal, a bumper 122 on the boom 22 will engage the spring can 120 moving a rod 124 and plate 126 longitudinally with respect to the can 120. The plate 126 will pivot a lever 128 about a pivot axis 130 causing an interconnected link 132 to pivot a crank arm 134 affixed to a rod 136 and having a second crank arm 138 affixed to said rod 136. The crank arm 138 is connected to a second link 140 which pivots a crank arm 142, rod 144 and a bifurcated member 146 carried by the rod. The bifurcated member 146 has facing pins 148 at the ends thereof which, as seen in FIGS. 2, 3, 7 and 8, align transversely to the axis of the cable and in the path of movement of the body portion 103 of the connector 102. Assuming that the boom 22 is moving through the 88° vertical position, the rod 124 and plate 126 will actuate the linkage to pivot the bifurcated member 146 in a counterclockwise direction as viewed in FIGS. 2 and 3 so that the pins 148 thereon will contact the body portion 103 of the connector 102 to move the connector 102, the valve spool 62 and the cable 58 to the right, in a manner to override the position of the actuating lever 26 and the position of the valve that is raising the boom 22 such that the movement of the valve spool 62 will shut off the valve thereby preventing further movement of the boom 22 toward the vertical position.

It is to be understood that any operating member of a vehicle that is intended to be limited in its movement can be controlled by the present kickout linkage arrangement so as to move the actuating lever 26 and valve spool to a position to avoid further movement of the operating member beyond a safe position. The bifurcated member 146 is adjusted relative to the connector 102 so that actuation of the kickout linkage will move the connector 102, the valve spool 62 and the lever 26 to the neutral position. The kickout linkage being connected to the valve instead of to the wench, reduces the number of parts in the linkage so as to simplify its operation.

We claim:

1. In an adjusting mechanism (92) for setting a valve spool (62) and an actuating lever (26) in a particular relationship, said valve spool (62) extending outwardly from a valve body (94), and said actuating lever (26) being pivotally mounted, the improvement comprising: means for connecting said extending end of the valve spool to said actuating lever, said means including first connecting means (99) and second connecting means (102), said first connecting means (99) being carried by said extending end of said valve spool (62), an indicator (110) located exterior of said valve body (94) along the path of movement of said extending end of said valve spool (62) to indicate a selected position of the valve spool (62) when said first connecting means (99) on the spool (62) aligns with said indicator (110), a cable (58) connecting said actuating lever (26) with second connecting means (102), said second connecting means (102) connecting with said first connecting means (99) on said valve spool (62), means (70) for locking said actuating lever (26) in a selected position to coincide with the selected position indicated by said indicator (110), and means (92) for adjusting said second connecting means (102) relative to said cable (58) to set said first connecting means (99) on the valve spool (62) in alignment with said indicator (110) when said lever (26) and valve spool (62) are in their respective selected positions coinciding with said particular relationship.

2. In an adjusting mechanism (92) as claimed in claim 1 wherein said first connecting means (99) on said spool (62) is a radially extending member (99) and said second connecting means (102) on said cable (58) engages with said radially extending member (99) and wherein said means (92) for adjusting second connecting means (102) relative to said cable (58) is an axial adjustment therebetween.

3. In an adjusting mechanism (92) as claimed in claim 1 wherein a housing (93) is carried by said valve body (94) and receives said valve spool (62) therein, and wherein said indicator (110) is a groove (110) formed in said housing (93) in a position to indicate the neutral position of the valve spool (62) when the first connecting means (99) on the valve spool (62) aligns with said indicator (110).

4. In an adjusting mechanism (92) as claimed in claim 1 wherein said means (70) for locking said actuating lever (26) is a lockdown knob (70) having a plate (80) with a cutout (90), said plate (80) being pivoted into position to nest the lever (26) in said cutout (90) to lock the lever (26) in a neutral position.

5. In an adjusting mechanism (92) as claimed in claim 1 wherein said first connecting means (99) on said valve spool (62) is a washer (99) and wherein said second connecting means (102) on said cable (58) is a connector (102) having a key (105) engaging with said washer (99), said connector (102) is threaded on said cable (58), the connector (102) is rotatable relative to the cable (58) to advance or retract the key (105) and washer (99) relative to the indicator (110).

6. In an adjusting mechanism (92) as claimed in claim 1 wherein said lever (26) is mounted for at least pivotal movement relative to a frame (12), a bellcrank (32) is pivotally mounted on said frame (12), means (36) for interconnecting said lever (26) and one arm (40) of said bellcrank (32) for pivotal movement of said bellcrank (32) responsive to pivotal movement of the lever (26), said cable (58) is connected to another arm (50) of said bellcrank (32) and to said valve spool (62), said lever (26) being pivotally moved to move said cable (58) and said valve spool (62).

7. In an adjusting mechanism (92) for a valve spool (62) of a valve the improvement comprising: a cable (58), an actuating lever (26) connected to said cable, said valve spool (62) extending outward from a valve body (94), a housing (93) carried by the valve body (94) into which housing (93) said valve spool (62) extends, connecting means (99) for connecting said extended end of said valve spool (62) with said cable, said connecting means (99) being positioned in said housing (93), indicator means (110) for indicating the neutral position of said valve spool (62), said indicator means (110) being located in said housing (93) to indicate a neutral position of the valve spool (62) when said connecting means (99) aligns with said indicator (110), said actuating lever (26) being located for ready access by an operator and being mounted for at least pivotal movement about the lower end thereof, a pivotally mounted bellcrank (32) connected to said lever (26) and to said cable (58), said cable (58) extending into said housing (93) and having a connector (102) mounted on said cable (58) and being in connecting relationship with said connecting means (99)

on said valve spool (62), means (70) for locking said lever (26) in a neutral position, and means (92) for adjusting said connector (102) relative to said cable (58), said means (92) moving said connector (102) relative to the cable (58) until said connecting means (99) on the valve spool (62) is aligned with the indicator (110) in the housing (93) to set both said lever (26) and said valve spool (62) simultaneously in their neutral positions.

8. In an adjusting mechanism (92) as claimed in claim 7 wherein said connecting means (99) on said valve spool (62) is a washer (99) and wherein said connector (102) is a disc (103) having a key (105) engaging with said washer (99), and wherein said means (92) for adjusting said connector (102) is a threaded connection between said disc (103) and said cable (58), said washer (99) is moved into alignment with said indicator (110) upon turning said disc (103) relative to said cable (58).

9. In an adjusting mechanism (92) as claimed in claim 7 wherein said means for locking said actuating lever (26) is a lock-down knob (70) having a plate (80) with a cutout (90), said plate (80) being pivoted into position to nest the lever (26) in said cutout (90) for locking the lever (26) in the neutral position.

* * * * *

UNITED STATES PATENT AND TRADEMARK OFFICE
CERTIFICATE OF CORRECTION

PATENT NO. : 4,301,834

DATED : November 24, 1981

INVENTOR(S) : Glen S. Comer, Jr. and Henry Ejchler

It is certified that error appears in the above-identified patent and that said Letters Patent are hereby corrected as shown below:

In the cover page:

Following "[76] Inventors: Glen S. Comer, Jr., Dunlap; Henry Ejchler, East Peoria, both of Ill.", please insert --[73] Assignee: Caterpillar Tractor Co., Peoria, Ill.--.

Following "Primary Examiner - A. Michael Chambers", please insert --Attorney, Agent, or Firm - Wegner, Stellman, McCord, Wood & Dalton--.

Column 5, line 43, "wench" and insert --winch--.

Signed and Sealed this

Thirtieth Day of March 1982

[SEAL]

Attest:

Attesting Officer

GERALD J. MOSSINGHOFF

Commissioner of Patents and Trademarks